H. C. STONE.
VEHICLE LOADING AND UNLOADING DEVICE.
APPLICATION FILED MAR. 9, 1920.
1,378,631.
Patented May 17, 1921.
5 SHEETS—SHEET 1.
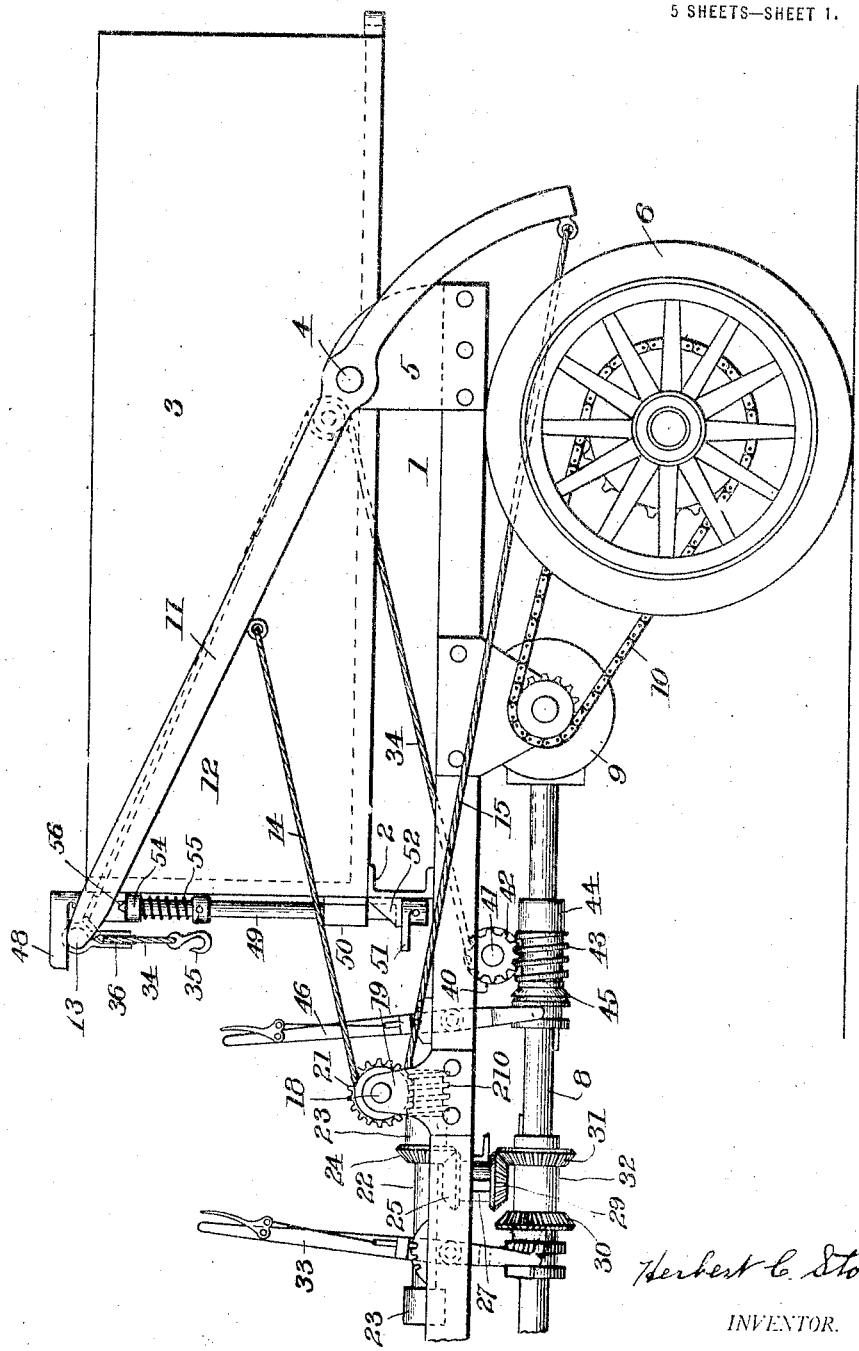
Herbert C. Stone,
INVENTOR.
BY
Frederick V. Winters,
ATTORNEY.

H. C. STONE.
VEHICLE LOADING AND UNLOADING DEVICE.
APPLICATION FILED MAR. 9, 1920.
1,378,631.
Patented May 17, 1921.
5 SHEETS—SHEET 2.
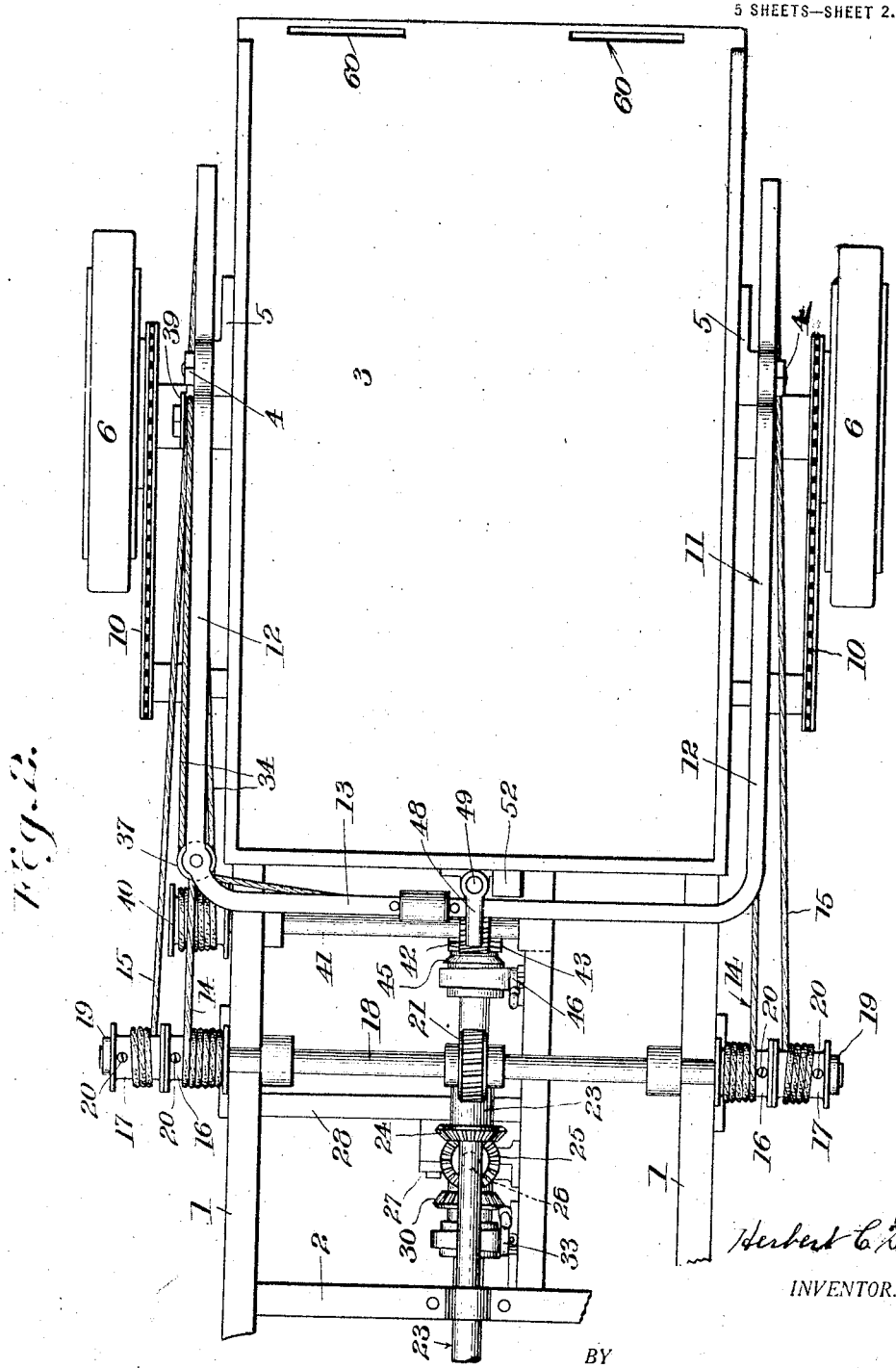
Herbert C. Stone
INVENTOR.
BY
Frederick V. Winters
ATTORNEY.

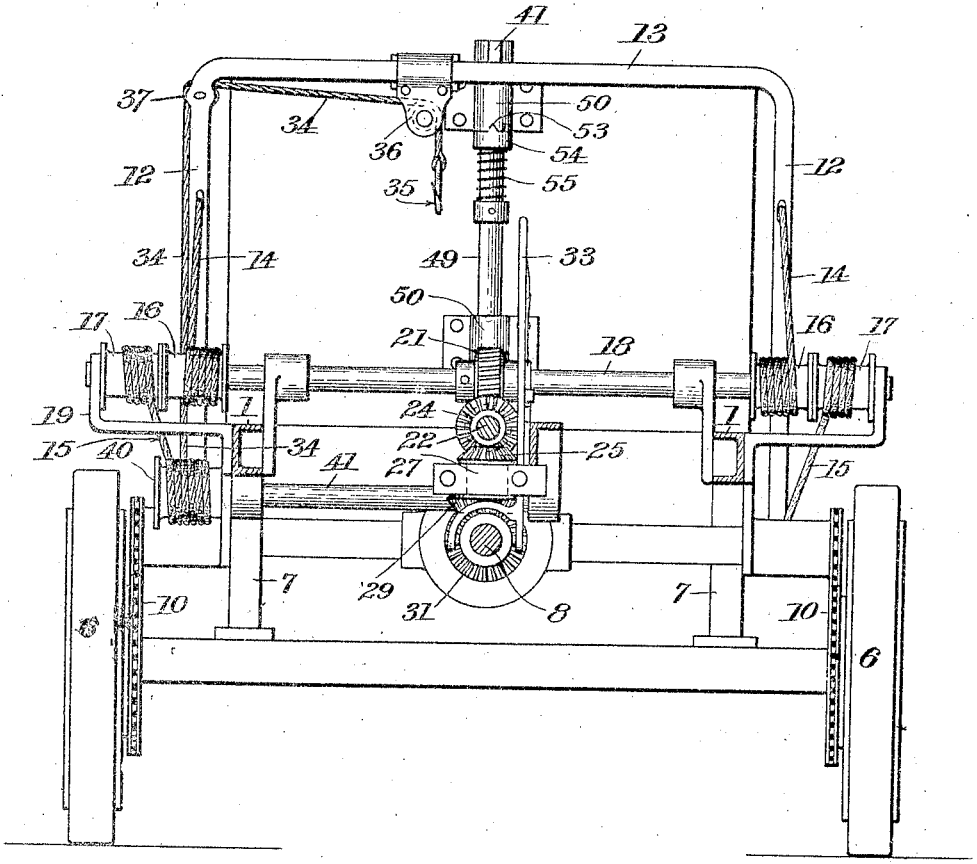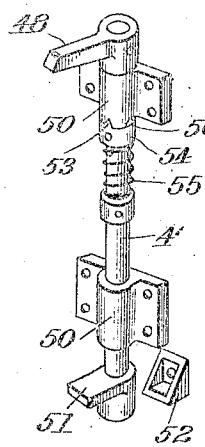

H. C. STONE.
VEHICLE LOADING AND UNLOADING DEVICE.
APPLICATION FILED MAR. 9, 1920.

1,378,631.

Patented May 17, 1921.
5 SHEETS—SHEET 4.

Herbert C. Stone
INVENTOR.

BY
Frederick V. Winters
ATTORNEY.

H. C. STONE.
VEHICLE LOADING AND UNLOADING DEVICE.
APPLICATION FILED MAR. 9, 1920.
1,378,631.
Patented May 17, 1921.
5 SHEETS—SHEET 5.
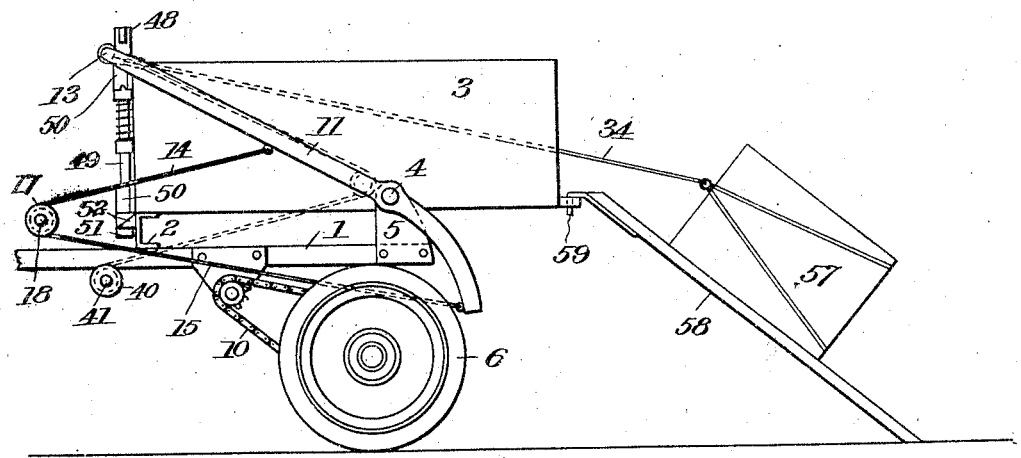
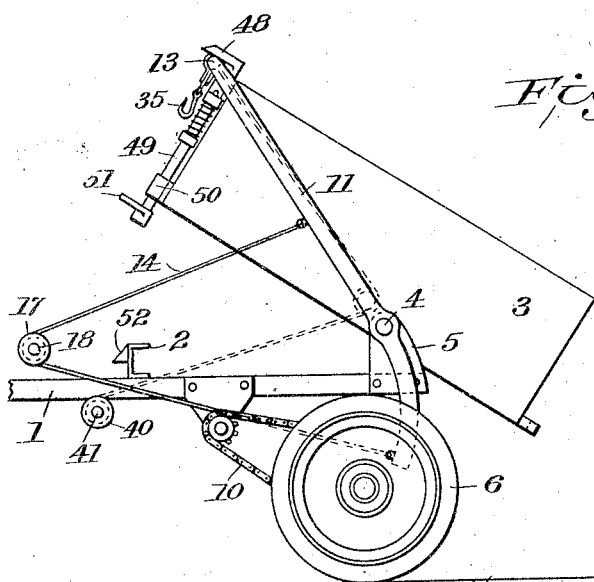
Herbert C. Stone INVENTOR.
BY
Frederick V. Winters ATTORNEY

UNITED STATES PATENT OFFICE.

HERBERT C. STONE, OF BROOKLYN, NEW YORK.

VEHICLE LOADING AND UNLOADING DEVICE.

1,378,631.  Specification of Letters Patent.  Patented May 17, 1921.

Application filed March 9, 1920. Serial No. 364,465.

*To all whom it may concern:*

Be it known that I, HERBERT C. STONE, a citizen of the United States, residing at Brooklyn, in the county of Kings and State of New York, have invented certain new and useful Improvements in Vehicle Loading and Unloading Devices, of which the following is a full, clear, and exact specification.

This invention relates to mechanism for loading and unloading vehicles, and is especially designed for use on motor trucks although it may also be adapted for use on other conveyances.

It is the aim of the invention to provide improved mechanism capable of handling loads of various sorts so that the loading or unloading mechanism best adapted for the particular load to be handled may be employed. Special objects are to provide improved means for hoisting and moving a load from a position in rear of the vehicle to a position on the front or other part thereof, means for drawing a load into the vehicle over a skid, when desired, and means for automatically and positively dumping the vehicle when required.

The invention also contemplates the provision of means for independently controlling the hoisting and traversing cables, means for adjusting the cable drums for the hoist so that they may be maintained properly taut, means for locking the traversing frame to the body when the latter is to be dumped, and means for simultaneously locking said body to the frame of the vehicle when it is released from said traversing frame, and vice versa. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side elevation of the rear or body portion of a motor truck equipped with loading and unloading mechanism substantially as contemplated by this invention.

Fig. 2 is a plan view of the same.

Fig. 3 is an end elevation of the device from the front, the side frame members of the truck and the engine shaft being broken just behind the front cross bar in Fig. 2.

Fig. 4 is a detailed perspective view of the locking device for securing the body of the vehicle to the frame thereof or to the traversing frame, respectively.

Fig. 8 is a diagrammatic side view of the truck showing how a load may be drawn into the body over a skid, and Fig. 9 is a similar view showing how the traversing frame may be attached to the body and used for dumping the same.

Figure 5:
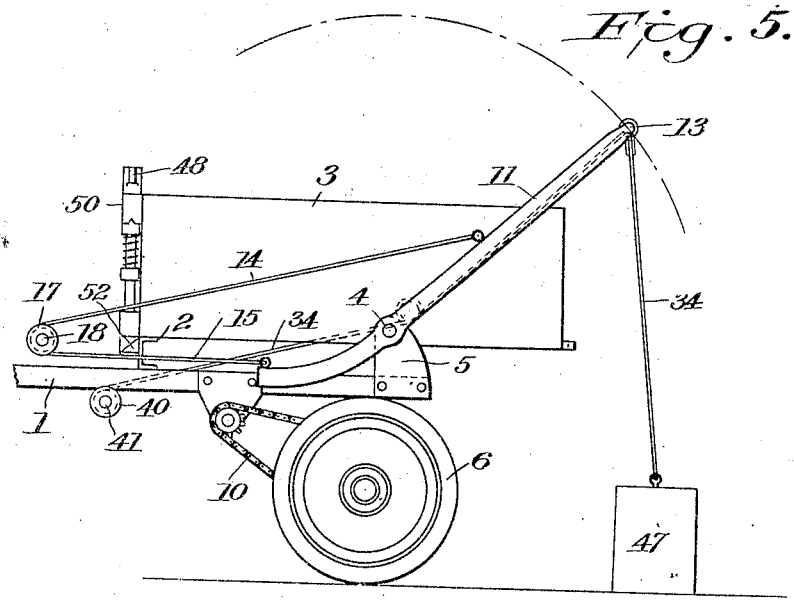
Fig. 5 is a diagrammatic side view of the truck showing how the hoisting and traversing mechanism may be used for shipping a load.

Any suitable form of vehicle frame or chassis may be provided, that shown consisting of side bars 1 and cross bars 2. The body 3 is pivoted at 4 to brackets 5 suitably fastened to the rear end portions of the side bars 1, and said rear end portion of the chassis is supported on traction wheels 6 by standards 7, Fig. 3, or otherwise. The engine shaft is indicated at 8 and the transmission at 9, the latter being connected to the wheels by chains 10 or otherwise.

Swiveled on the same pivots 4 on which the body is mounted is a traversing frame 11 comprising side members 12 arranged at the sides of the body, and a cross bar 13 preferably made integral with said side members and arranged adjacent the front end of the body when said frame 11 is depressed into the position shown in Figs. 1, 2 and 3. The free or lower ends of the side members 12 of the traversing frame extend some distance beyond the pivots 4. Said frame 11 is adapted to be swung upon the pivots 4 in either direction by means of two sets of cables 14 and 15, the former being attached to the side members 12 above the pivots and the latter being attached to said side members below the pivots near the extremities of said side members.

Said cables 14 and 15 are mounted to wind in opposite directions upon drums 16 and 17 on the ends of a transverse shaft 18 suitably journaled in brackets 19 on the side bars 1 of the chassis. The drum 16 and 17 are adjustably fastened to the shaft 18 by set screws 20, Fig. 2, permitting them to be adjusted to take up any slack in the cable 14 and 15, so that there will be no loose play in said cables in actuating the traversing frame 11.

The shaft 18 carries a worm gear 21 meshing with a worm 210 on a counter shaft 22 suitably journaled at 23 on one of the cross bars 2 of the chassis. Said countershaft 22 also carries a bevel gear 24 meshing with a bevel gear 25 on a short vertical shaft 26 journaled at 27 on an intermediate longitudinal bar 28 of the chassis, Figs. 2 and 3. The shaft 26 also carries a bevel gear 29 adapted to mesh with either of two facing bevel gears 30 and 31 on a sleeve 32 splined on the engine shaft 8 and controlled by a lever 33. By suitably adjusting said lever 33, the sleeve 32 may be moved to disengage both gears 30 and 31 from the gear 29, which will be the neutral position of said lever, or either of said gears 30 or 31 may be brought into mesh with said gear 29 for rotating the shaft 18 in one direction or the other through the shafts 26, gears 25 and 24, shaft 22, worm 210 and gear 21. When said shaft 18 is thus rotated in one direction, the cables 14 will be wound up on their drums 16 and the cables 15 simultaneously unwound from their drums 17, with the result that the traversing frame 11 will be swung forwardly, while the reverse rotation of said shaft 18 will wind up the cables 15 and unwind the cables 14, thereby swinging said traversing frame 11 rearwardly.

Figure 7:
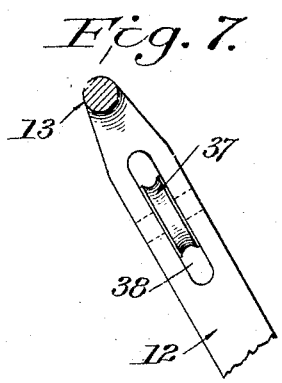
Fig. 7 is a detailed view of the upper end portion of the traversing frame, showing how the upper side pulley or sheave for the hoisting cable is mounted thereon.

A hoisting cable 34, carrying a hook 35 on its free end, is threaded through a sheave 36 on the cross bar 13 of the traversing frame, and another sheave 37 set in a slot 38 in one of the side members 12 of said traversing frame, Figs. 2, 3 and 7, and passed around a third sheave 39 on the outer face of said side member 12 near the pivot 4. From said sheave 39, the cable 34 extends forwardly and is wound upon a drum 40 on a short transverse shaft 41 suitably journaled upon the chassis in rear of the shaft 18.

Figure 6:
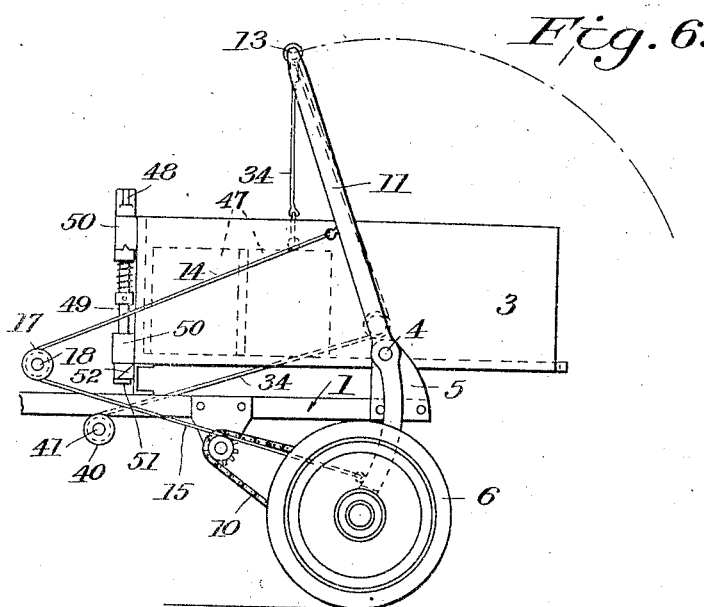
Fig. 6 is a similar view showing the completed operation of loading with the hoist and traversing frame.

The shaft 41 carries a worm gear 42 meshing with a worm 43 on a sleeve 44 on the engine shaft 8, said sleeve being loose on said shaft but adapted to be coupled up to turn therewith at will by means of a suitable clutch 45 splined on the engine shaft and controlled by a lever 46. It will thus be seen that the hoisting cable may be actuated independently of the cables for actuating the traversing frame, and vice versa. Thus, as illustrated in Figs. 5 and 6, the traversing frame 11 may be swung rearwardly and the hoisting cable 34 paid out to enable the hook 35 to be engaged with a load 47, said cable then drawn or wound up to raise the load, the frame 11 then swung forwardly to bring said load above the desired point on the body 3, and the hoisting cable again paid out to lower the load onto the body.

When it is desired to dump the body, the cross bar of traversing frame 11 may be locked to the front end of said body by a latch member 48 on a rotatable pintle 49 suitably journaled at 50 on the front of the body. The swinging of the frame 11 rearwardly when it is thus connected or locked to the front end of the body, will accomplish the desired dumping of said body, as shown in Fig. 9.

The pintle 49 carries another latch member 51 on its lower end which is adapted to interlock with a lug 52 on one of the cross bars 2 of the chassis when the latch member 48 is disengaged from the traversing frame 11, as shown in Fig. 8. It will be noted that when said latch member 48 is engaged with the frame 11 the latch member 51 is disengaged with the lug 52 so that it is impossible for the body to be locked down and also locked to the frame 11 at the same time, the operation of locking to one simultaneously unlocking from the other. The pintle may be retained in either of its locking positions, so as to prevent its accidental displacement, by a tooth 53 on a collar 54 mounted to slide on the pintle and pressed by a spring 55, said tooth being adapted to engage either one of two notches 56 in one of the journal members 50, as best illustrated in Fig. 4. In manually turning the pintle 49 to move it from one locking position to the other, the tooth 53, which is made V-shaped for that purpose, is forced out of the notch in which it happens to be engaged, and said tooth rides along the edge of the notched journal 50 until it reaches the other notch, whereupon the spring 55 seats it in said notch.

Fig. 8 illustrates how the device may be utilized for drawing a load 57 into the body 3 over a skid 58 which may have hooks 59 on its upper end to engage with slots 60, Fig. 2, in the rear end of the floor of the body. When this manner of loading is to be employed, the frame 11 is swung forward and retained in that position while the hoisting cable 34 is actuated to haul the load aboard by means of the hook 35 being engaged with said load. During this operation the body 3 is locked to the chassis, as shown in Fig. 8, to prevent tipping of the body under the load.

Having thus described my invention, what I claim as new and desire to secure by Letters Patent of the United States is:—

1. The combination with a vehicle and the body thereof, of a U-shaped traversing frame pivoted astride said body to swing in a vertical plane, the side members of said frame being intermediately pivoted to the vehicle, a shaft, cables wound in opposite directions on said shaft and connected to said side members of the frame at opposite sides of the pivots thereof, and means for actuating said shaft in either direction for swinging the frame in either direction.

2. The combination with a motor vehicle and the engine shaft thereof, of a traversing frame pivoted to swing in a vertical plane on the vehicle, two transverse shafts on the vehicle, cables wound in opposite directions on one of said shafts and connected to said frame at opposite sides of the pivot thereof, a hoisting cable wound on the other transverse shaft and running over said frame, and means for independently actuating said transverse shafts from the engine shaft.

3. The combination with a vehicle, of a dumping body, a traversing frame pivoted astride said body, means for swinging said frame in a vertical plane, and means for locking said frame to the body for dumping the latter when the frame is actuated.

4. The combination with a vehicle, of a dumping body, a U-shaped frame pivoted astride said body, means for swinging said frame in a vertical plane, and a latch for locking the front end portion of the body to the cross bar of the frame, whereby the actuation of the latter will dump the body.

5. The combination with a vehicle, of a dumping body, a frame pivoted to swing in a vertical plane, means for actuating said frame, a pintle swiveled on the front end portion of the body and having latch members on its upper and lower ends, and a lug fixed to the vehicle and adapted to be engaged by the latch member on the lower end of the pintle for locking the body against dumping when the latch member on the upper end of the pintle is disengaged from the frame, and vice versa.

6. The combination with a vehicle, of a dumping body, a frame pivoted to swing in a vertical plane, means for actuating said frame, means for locking said frame to the body for dumping the same when the frame is actuated, and means for automatically locking said body to the vehicle against dumping when the frame is released from the body, and vice versa.

7. The combination with a vehicle, of a dumping body, a frame pivoted to swing in a vertical plane, means for actuating said frame, means for locking said frame to the body for dumping the same when the frame is actuated, means for automatically locking said body to the vehicle against dumping when the frame is released from the body, and vice versa, and means for retaining said locking means in either position.

8. The combination with a vehicle, of a dumping body, a frame pivoted to swing in a vertical plane, means for actuating said frame, a pintle swiveled on said body and having latch members to alternately secure said body to said frame and to the vehicle chassis, and a spring pressed tooth on said pintle to retain the same in either position.

9. The combination with a vehicle, of a dumping body, a frame pivoted to swing in a vertical plane, means for actuating said frame, a pintle swiveled on said body and having latch members to alternately fasten the body to the frame for dumping, and fasten the body to the vehicle chassis against dumping, a bearing for said pintle having V-shaped notches therein, and a spring pressed collar on said pintle having a V-shaped tooth to engage either of the notches in the bearing for retaining the latch members in either position.

10. The combination with a vehicle, of a traversing frame pivoted to swing in a vertical plane on the vehicle, two transverse shafts on the vehicle, cables wound in opposite directions on one of said shafts and connected to said frame at opposite sides of the pivot thereof, a hoisting cable wound on the other transverse shaft and running over said frame, a driving shaft, and means for independently actuating said transverse shafts from the driving shaft.

In testimony whereof I have signed my name to this specification.

HERBERT C. STONE.